United States Patent
Carney et al.

(10) Patent No.: US 11,936,633 B2
(45) Date of Patent: *Mar. 19, 2024

(54) CENTRALIZED MANAGEMENT OF PRIVATE NETWORKS

(71) Applicant: Tailscale Inc., Toronto (CA)

(72) Inventors: David F. Carney, Toronto (CA); Avery Pennarun, Montreal (CA); David Crawshaw, Berkeley, CA (US)

(73) Assignee: Tailscale Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,403

(22) Filed: Feb. 3, 2023

(65) Prior Publication Data

US 2023/0179582 A1 Jun. 8, 2023

Related U.S. Application Data

(63) Continuation of application No. 16/936,076, filed on Jul. 22, 2020, now Pat. No. 11,575,661.

(51) Int. Cl.
*H04L 9/40* (2022.01)
*H04L 61/5007* (2022.01)

(52) U.S. Cl.
CPC ...... *H04L 63/0442* (2013.01); *H04L 61/5007* (2022.05); *H04L 63/0807* (2013.01); *H04L 63/083* (2013.01)

(58) Field of Classification Search
CPC ............ H04L 63/0442; H04L 61/5007; H04L 63/0807; H04L 63/083; H04L 61/2514
USPC ....................................................... 713/168
See application file for complete search history.

(56) References Cited

U.S. PATENT DOCUMENTS

| | | | |
|---|---|---|---|
| 7,058,181 B2 | 6/2006 | Wright | |
| 9,819,494 B2* | 11/2017 | Ryu | ............... H04L 9/3247 |
| 10,327,314 B1* | 6/2019 | Shin | ................. H04W 4/80 |
| 10,708,774 B2 | 7/2020 | Koo | |
| 11,290,434 B2* | 3/2022 | Moritomo | ............ H04L 63/123 |
| 2012/0328101 A1* | 12/2012 | Lakshminarayanan | ...................... H04L 63/0823 380/258 |
| 2015/0039883 A1* | 2/2015 | Yoon | ................... H04L 9/0847 713/155 |
| 2017/0070350 A1* | 3/2017 | Ryu | ................... H04L 63/0838 |
| 2017/0141924 A1* | 5/2017 | Ryu | ................... H04L 9/3236 |
| 2018/0026949 A1 | 1/2018 | Kimn et al. | |

(Continued)

OTHER PUBLICATIONS

Towards secure mobility support for IP networks, Mink et al, Aug. 2000 (Year: 2000).*

(Continued)

*Primary Examiner* — Jahangir Kabir

(57) ABSTRACT

Described herein are systems, methods, and software to manage private networks for computing elements. In one example, a computing element may obtain credential information associated with a user and generate a public-private key pair for the computing element. The computing element may further communicate the public key from the pair with metadata to a coordination service to register the computing element at the coordination service. Once registered, the computing element may receive communication information associated with one or more other computing elements that permit the computing element to communicate with the other computing elements.

12 Claims, 8 Drawing Sheets

(56) References Cited

U.S. PATENT DOCUMENTS

2018/0240107 A1* 8/2018 Andrade .............. G06Q 20/065
2018/0278523 A1* 9/2018 Ong ........................ H04L 45/60
2021/0099438 A1   4/2021 Kurian

OTHER PUBLICATIONS

Security and Privacy in Device-to-Device (D2D) Communication: A Review, Haus et al, Apr. 2017.

* cited by examiner

CENTRALIZED MANAGEMENT OF PRIVATE NETWORKS

RELATED APPLICATIONS

This application is a continuation of U.S. application Ser. No. 16/936,076 entitled "CENTRALIZED MANAGEMENT OF PRIVATE NETWORKS" filed Jul. 22, 2020, which is hereby incorporated by reference in its entirety.

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring individual networks can be difficult and cumbersome. These difficulties are compounded when a network includes different types of computing systems with different firewall and other security measures.

SUMMARY

The technology described herein manages the deployment of private networks for computing systems. In one implementation, a method of operating a computing element to join a private network includes obtaining credential information associated with a user of the computing element and generating public and private keys associated with the computing element and the user. The method further includes communicating the public key with computing element metadata to a coordination service, wherein the computing element metadata comprises at least a portion of the credential information. The method also provides receiving communication information associated with one or more other computing elements for the user.

DETAILED DESCRIPTION

Figure 1:
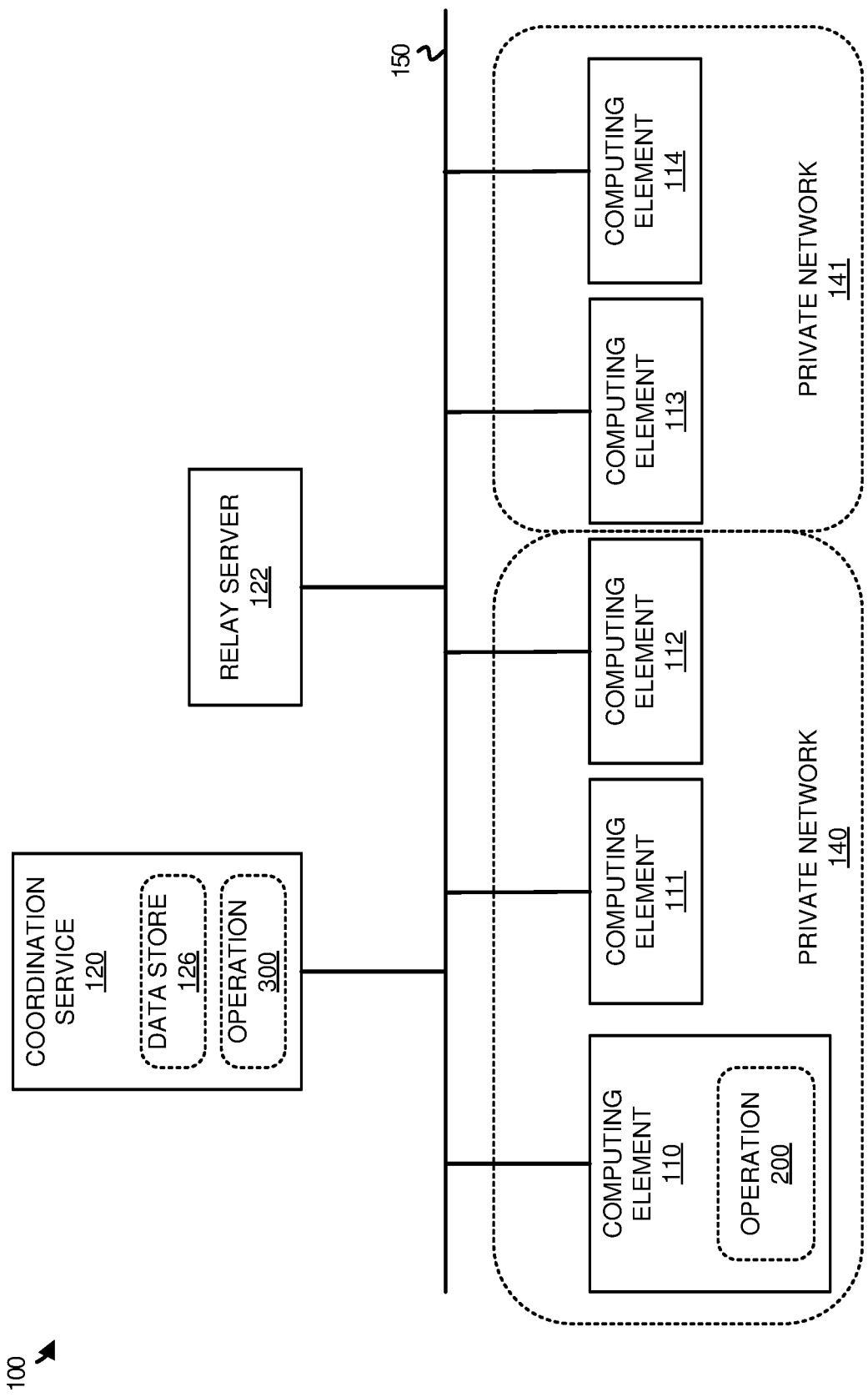
FIG. 1 illustrates a computing environment to manage private networks for computing systems according to an implementation.

The following discussion presents operations and techniques to provide private networking between various computing elements. These computing elements may comprise physical devices, such as desktop computers, servers, tablets, and the like, and may further comprise virtual computing elements, such as virtual machines or other virtualized endpoints. Here, to support private networking, a coordination service is deployed that is capable of managing the connection information for each of the computing elements in the private networks. In at least one example, an application or service may execute on the local computing element that prompts a user for login information. This login information may include a username, password, a token, a key, or some other similar credential, including combinations thereof. Once the login information is provided, the login information may be communicated to an authentication service, which may be provided by the coordination service or some other web service, such as an organization, social media service provider, or some other web service. Once the login information is authorized, the user may be allocated a token for use with their associated profile.

In addition to obtaining a token for the user, the computing element may obtain a device identifier or cookie that can be used to uniquely identify the requesting device. In some implementations, the device identifier may be generated by the private networking application at the local computing element, however, it should be understood that the device identifier or cookie may be allocated by coordination service 120. The combination of the token for the user and the device identifier may be used to register the computing element with the coordination service. In some implementations, the computing element may provide the token from the authentication service to the coordination service and/or the authentication service may provide the token for the computing element to the coordination service. The combination of the token and the device identifier may then be added as part of a computing element entry for the coordination service. In some examples, the combination of the token and the device identifier may be used as a registration key for the device with the user.

In addition to storing information about the computing element and the user, the computing element may also generate public key and private key pair that can be used to encrypt the traffic associated with the private network. Once the public key is generated, the computing element may communicate the public key to the coordination service, such that the coordination service may store the public key in the entry associated with the computing element and user. In some examples, the coordination service may further maintain metadata information about the computing element, wherein the metadata may include one or more internet protocol (IP) addresses associated with the computing element, communication port information associated with the computing element, operating system information for the computing element, hardware information for the computing element, or some other metadata associated with the computing element. In some examples, the public key that is provided to the coordination service may be used to verify the private key for a particular computing element. In verifying the private key, the computing element may send defined data encrypted using the private key and the coordination service may decrypt the data using the public key. Once decrypted, the coordination may compare the data to expected data to determine if the public key is permitted.

As the coordination service obtains information for the new computing element, the coordination service may further distribute the information to one or more other computing elements in the same private network. The information that is distributed may include addressing information for the new computing element, the public key for the new computing element, or any other information permitting other computing elements to communicate with the new computing element. The coordination service may further update the entries based on changes to permissions or addressing of the computing elements, wherein the updates may be used to remove entries that no longer have the required token or computing element identifier, change one or more IP addresses associated with a computing element, modify port information for a computing element, or some other information for the computing element. These updates may occur based on periodic checks to the computing elements, based on the computing elements providing new information to the coordination service, or at some other interval dictated by the coordination service or the computing elements.

Once the communication information is obtained at a computing element for other computing elements in the same private network, the computing element may send and receive packets to the other computing elements using the communication information for the other computing elements. In some implementations, each computing element in a private network may be allocated a unique private IP address by the coordination service, wherein applications on the computing elements may communicate with other computing elements in the private network using the unique IP addresses. When a packet is identified with a destination IP address allocated from the coordination service, the private networking service on the computing element may encrypt the packet using private key and add addressing capable of communicating with the destination computing element (e.g., a public IP address and port for the computing element).

In some implementations, the coordination service may be used to separate the different private networks and permissions for the computing elements registering for a private network. In separating the private networks, the coordination service may identify a user (based on the token or other metadata information from the computing element) for the computing element and determine permissions associated with the user. In some examples, the user computing element may only communicate with other computing elements registered by the same user, however, a configuration may permit multiple users to join a single network. The separation of private networks may further be based on the type of computing element being registered or some other information associated with the user or computing element. As an example, when a user registers a new user device, such as a laptop, the coordination service may identify all other computing elements associated with the user, wherein the computing elements may be registered by the user or may be registered by other users associated with the user.

FIG. 1 illustrates a computing environment 100 to manage private networks for computing systems according to an implementation. Computing environment 100 includes coordination service 120, relay server 122, and computing elements 110-114, wherein computing elements 110-112 belong to private network 140 and computing elements 113-114 belong to private network 141. Although demonstrated with two private networks, it should be understood that coordination service 120 may maintain information for any number of private networks. Computing element 110 implements operation 200, which is further described below with respect to FIG. 2. Coordination service 120 further includes data store 126 and implements operation 300 that is further described below with respect to FIG. 3. Coordination service 120, relay server 122, and computing elements 110-114 communicate using network 150. Coordination service 120 may execute using one or more physical computing devices, such as servers, desktop computers, or some other computing element.

In operation, computing elements 110-114 may use coordination service 120 to allocate and manage private networks 140-141. Computing elements 110-114 may comprise physical computing devices or may comprise virtualized endpoints, such as virtual machines. On each of the computing elements, an application or service may be used to register and maintain private networking information associated with the computing element. In one implementation, the local application may prompt a user for login information, wherein the login information may be unique to coordination service 120 or may be provided for an authentication service, such as a social media login, corporate login, or some other login. The login information may comprise a username, password, key, or some other information. Once the information is obtained, the authentication service may provide a token that can be used to identify the user for coordination service 120.

In some implementations, in addition to identifying the user, coordination service 120 may, when a login is generated, provide an identifier to the computing element to uniquely identify the computing element. In other examples, the local private networking application providing operation 200 may generate a unique device identifier, wherein the identifier may comprise any number of bits and may be generated using a hash function or some other mechanism to generate a unique identifier. An entry in data store 126 for a computing element may include a token associated with the user and the unique identifier for the specific computing element (together referred to as a "device key"). Other information for the entry may include the public key to decrypt packets from the computing element, device type information, such as operating system, physical computing hardware information, or some other information, and addressing information associated with the computing element (IP addresses, MAC addresses, and the like). The device information may then be distributed to other computing elements in the private network. As an example, when computing element 110 joins private network 140, the information about the computing element is provided to coordination service 120 and stored in data store 126. The information may then be distributed to computing elements 111-112, permitting the other computing elements in private network 140 to communicate with computing element 110.

Figure 2:
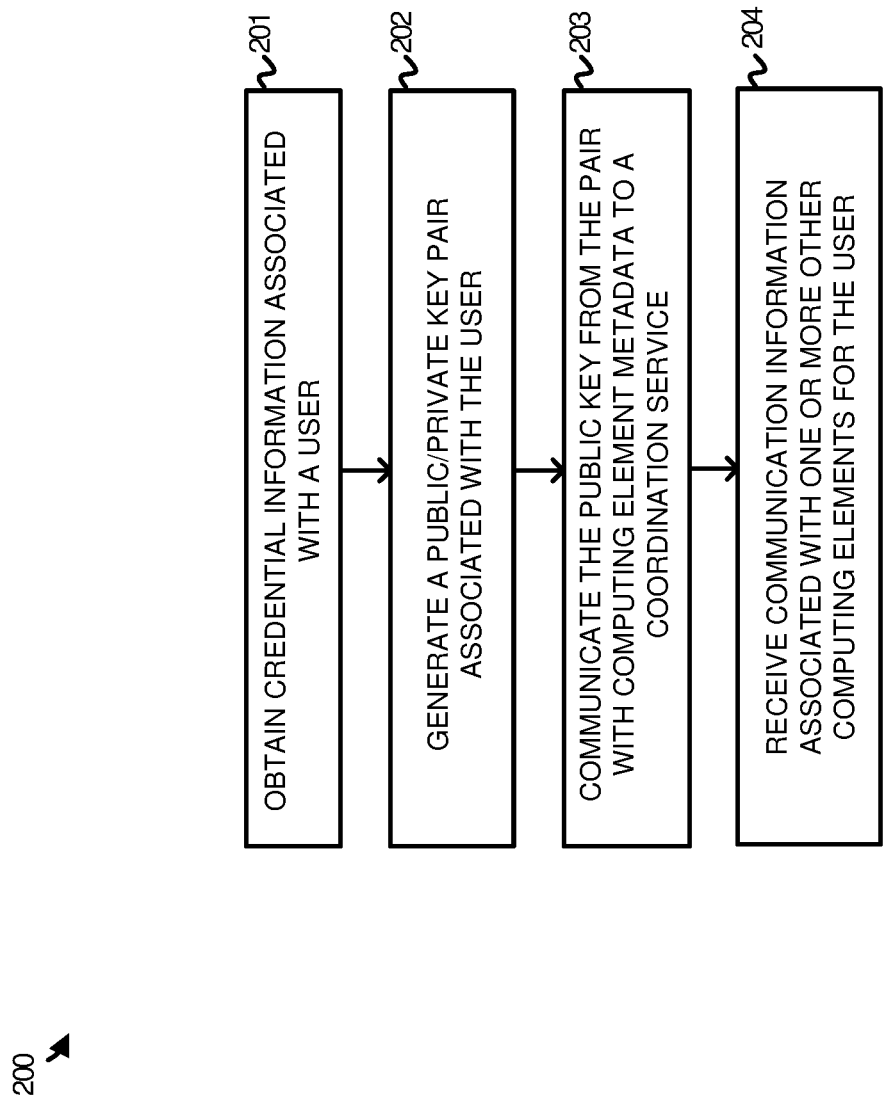
FIG. 2 illustrates an operation of a computing system to join a private network according to an implementation.

FIG. 2 illustrates an operation 200 of a computing system to join a private network according to an implementation. The steps of operation 200 are referenced parenthetically in the paragraphs that follow with reference to systems and elements of computing environment 100 of FIG. 1. Although demonstrated using computing element 110, it should be understood that other computing elements 111-114 may implement similar operations to join a private network.

As depicted, operation 200 includes obtaining (201) credential information associated with a user of the computing element. In some implementations, a user may provide a username, password, token, or some other credential associated with an authentication service. The authentication service may be provided by coordination service 120 or may be used in conjunction with some other web service, such as Google™ or Facebook™. Once the authentication service identifies the user, the user may be allocated a token that can be used to authenticate the user for the device. In some examples, in addition to the user identifying token, operation 200 may obtain a device identifier from coordination service 120 or may generate a local unique device identifier. This unique device identifier along with the token from the authentication service may be used to uniquely identify the user and the corresponding computing element.

In addition to identifying the credential information, including the token, operation 200 further generates (202) a public key and private key associated with the computing element and the user. This public key and private key may be used to encrypt communications directed at other computing elements in the private network. For example, the private key may be used to encrypt a communication from computing element 110 to computing element 111, while the public key may be used to decrypt the communication at computing element 111.

After the public and private keys are generated, operation 200 communicates (203) the public key with computing element metadata to a coordination service, wherein the computing element metadata comprises at least a portion of the credential information. In some implementations, the credential information may include the token supplied by the authentication service, the unique identifier associated with the computing element, or some other credential information. The metadata supplied by the computing element may include addressing information for the computing element, software and hardware information for the computing element, or some other information about the computing element. Once communicated, coordination service 120 may associate the credential information with the key and device metadata in data store 126, such that each device for a user's network may include an entry in the data store.

After communicating the computing element metadata and public key, operation 200 further receives (204) communication information associated with one or more other computing elements for the user. The communication information may include public key information for the other computing elements, addressing information for the other computing elements, or some other information for the other computing elements. For example, computing element 110 may obtain addressing information for computing element 111 and may obtain a public key associated with communications from computing element 111. When a communication is received from computing element 111, computing element 110 may identify source addressing in the communication and apply a public key associated with the source addressing decrypt the payload of the communication.

In some implementations, coordination service 120 may allocate each of the computing elements 110-112 with a unique private IP address to communicate with other computing elements in the same private network. When a packet is generated at one of the computing elements, the private networking application executing locally on the computing element may identify the use of a private destination IP address for the packet, encrypt the packet into a load of a second packet, add header information with a public IP address for the destination to the second packet, and transfer the second packet to the receiving computing element.

In some examples, communications between computing elements may take different paths, wherein the communication paths may be made over a local network, may be made directly over the internet, or be made using relay server 122 that can provide a gateway between computing elements. The private networking application on a computing element may perform tests to determine which of the paths should be used for a communication. These tests may be performed when a communication is requested with another computing element, at periodic intervals, when a computing element joins a new local network (e.g., moving from work to home network), or at some other interval. Based on the tests, which may comprise latency, throughput, and other network tests, the computing element may select a path to another computing element in the private network. For example, when computing element 110 initiates a communication with computing element 111 using the unique private IP address allocated by coordination service 120, the private networking application on computing element 110 may determine a preferred path to computing element 111 and generate a private network packet for the communication with destination addressing to support the path. This destination address may comprise a local (private) network IP address if the computing elements are on the same local network or may comprise a remote (public) network IP address if the destination computing element is not on the same local network.

In some examples, when a communication is required by an application executing locally on computing element 110, the application may use a unique IP address allocated by coordination service 120 to another computing element in private network 140. Once the communication is identified, the local private networking application on computing element 110 may perform network address translation (NAT) to determine destination addressing attributes (destination IP address, port, etc.) to communicate with the required computing element. This translation operation may permit one or more applications on computing element 110 to communicate with other computing elements using static private addresses that can be translated into the required destination address.

In some examples, the application executing locally on the computing element may be used to open one or more ports in a firewall for a network to receive packets from other computing elements in the same private network. The application may use keep-alive outgoing packets to open one or more ports that permits other computing elements to communicate using the one or more open ports. For example, computing element 110 may open one or more ports to receive communications from computing elements 111-112 by perform a check-in with the coordination service, wherein the check-in may provide updated addressing information (IP address, port, and the like) for the computing element. In some examples, when opening the ports, a firewall for computing element 110 may permit computing elements 111-112 to directly communicate with computing element 110, however, communications may be required to traverse relay server 122 in some examples. Relay server 122 may be used when a firewall for a computing element prevents the direct connections from multiple computing elements.

In some implementations, the addressing information cached in data store 126 may be updated at various intervals. The addressing information may be updated when a computing element joins a new local network, at a periodic interval, when a configuration change is detected by the local private networking application for the computing elements, or at some other interval. Using an example for computing element 110, computing element 110 may represent a laptop computer, wherein addressing information associated with the laptop computer may be different on a work network than a home network. As a result, computing element 110 may provide updates to IP addresses, firewall configurations, or any other addressing information when the device joins a new network.

In some examples, the private/public key for each of the computing elements may be updated periodically, by request of coordination service 120, or at some other interval. When an update event occurs, the computing element may generate a new private/public key pair and communicate the new public key to the coordination service in a manner that indicates possession of the original private key. This communication may include encrypting the new public key using the old private key and verifying the new public key, at the coordination service, by decrypting the communication at the coordination service using the old public key. Once it is determined that the computing element has possession of the old private key, the public key cached by coordination service 120 may be updated and distributed to other computing elements in the same network. The other computing elements may include credential information for the same user, such as a token, or may include other users in a shared user group, wherein multiple users may share a private network.

Figure 3:
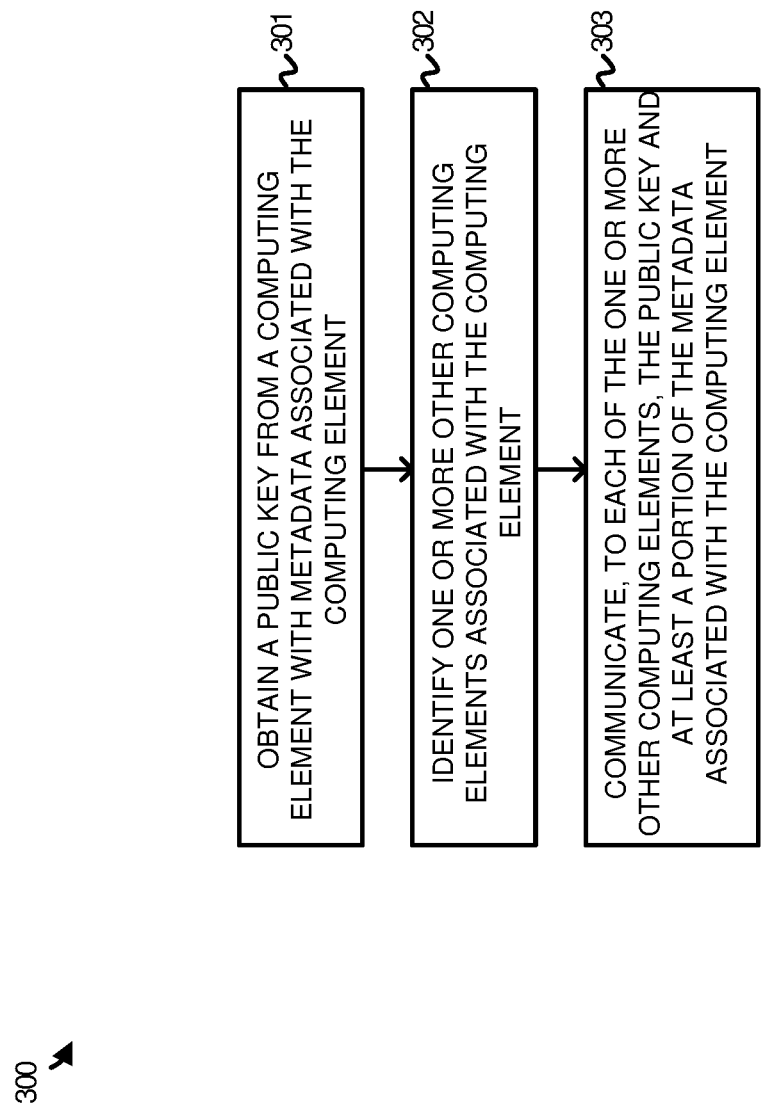
FIG. 3 illustrates an operation of a coordination service to manage private networks according to an implementation.

FIG. 3 illustrates an operation 300 of a coordination service to manage private networks according to an implementation. The steps of operation 300 are referenced parenthetically in the paragraphs that follow with reference to systems and elements from computing environment 100 of FIG. 1.

As depicted, coordination service 120 provides operation 300 and obtains (301) a public key from a computing element with metadata associated with the computing element. In some implementations, computing elements, both physical and virtual, may execute a private networking application to join a user and device to a private network consisting of other computing elements associated with the user. When a request is generated at the computing element, the computing element may be allocated a unique computing element identifier for the device and a user token may be obtained to verify the user. The unique identifier may be allocated by coordination service 120 or generated by the locally executing private networking application, while the user token may be provided by an authentication service provided by coordination service 120 or some other authentication service. The token and device identifier may be used to uniquely identify the computing element for the user communications. In addition to authorizing the computing element for communications, the local private networking application on the computing element may generate a private/public key pair that can be used to encrypt and decrypt communications for the computing element. This public key may be provided with computing element metadata to coordination service 120, wherein the computing element metadata may include authentication information (unique computing element identifier, token, and the like) and addressing information associated with the computing element. The addressing information may include IP addressing information, MAC addressing information, or some other addressing information for the computing element.

Once the public key and metadata are obtained for the computing element, operation 300 further identifies (302) one or more other computing elements associated with the new computing element. In some implementations, coordination service 120 may identify entries in data store 126 that correspond to the user of the newly registered computing element. The entries that correspond to the user may include computing element registered by the same user or may include computing elements registered by other users. The different users and computing elements that are available to belong to a private network may be configured by an administrator, wherein the administrator may define what types of computing elements and what users should belong to the same private network. For example, if computing element 110 provided public key and metadata information to coordination service 120, coordination service 120 may identify other entries in data store 126 that correspond to the token provided for computing element 110 (computing elements 111-112). After the one or more other computing elements are identified, coordination service 120 may communicate (303), to each of the one or more other computing elements, the public key and at least a portion of the metadata associated with the computing element.

In an example, when computing element 110 registers for private network 140, computing element 110 may provide a public key generated at the computing element with addressing information associated with the computing element. Once received, coordination service 120 may distribute the public key and addressing information to computing elements 111-112 that belong to the same private network as computing element 110. The addressing information may permit the computing elements to identify and communicate packets with the other computing elements in the network, while the public key may be used to decrypt payloads from the other computing element.

In some implementations, when a new computing element is registered with coordination service 120, coordination service 120 may allocate a unique virtual static private IP address to the computing element. This may permit computing elements in the same private network to use the virtual IP addresses allocated by the coordination service to communicate with other computing elements in the private network, while the private networking application translates the virtual IP address into the required address for the computing element. The required address may comprise a local network IP address (private) if the two computing elements are on the same local network or may comprise a public IP address if the two computing elements are located on different local networks. In some implementations, the path for the communication may be required to traverse a relay server 122 that can act as an intermediary and bypass firewall restrictions associated with the computing elements. The path may be selected based on latency for each of the paths, throughput for each of the paths, or some other characteristic.

In some examples, coordination service 120 may update data store 126 with new public keys or addressing attributes associated with each of the computing elements. As an example, each computing element for private network 140 may periodically, at the request of coordination service 120, or at some other interval update the private/public key pair used for encrypting the packets. The computing elements may provide the updated public key to coordination service 120 and coordination service 120 may distribute the updated keys to the other computing elements. In some examples, the new public key may be provided using the previous private key, wherein the previous private key may encrypt the new public key and provide the public key to the coordination service. Once the coordination service receives the new public key (and decrypts the new public key), the coordination service may verify that the new public key was generated by the same computing element associated with the old private/public key. This verification may be accomplished by comparing expected values for the communication of the public key to actual values, wherein a match between the values may indicate that the computing element possessed the old private key. For example, computing element 110 may replace a first public/private key pair with a second public/private key pair. To replace the key, computing element 110 may provide the second public key to coordination service 120 in a manner that indicates possession of the first private key. Computing element 110 may demonstrate possession of the first private key by encrypting at least the second public key using the first private key. Once received at coordination service 120, coordination service 120 may decrypt using the first public key and determine whether the data in the communication matches or verifies that computing element 110 possessed the first private key.

Similarly, updates may be generated when an element is removed from the network. In particular, in response to a request to remove a computing element, coordination service 120 may provide an update to the remaining computing elements in private network to remove or delete the public key associated with the deleted computing element and remove addressing information associated with the deleted computing element.

Figure 4:
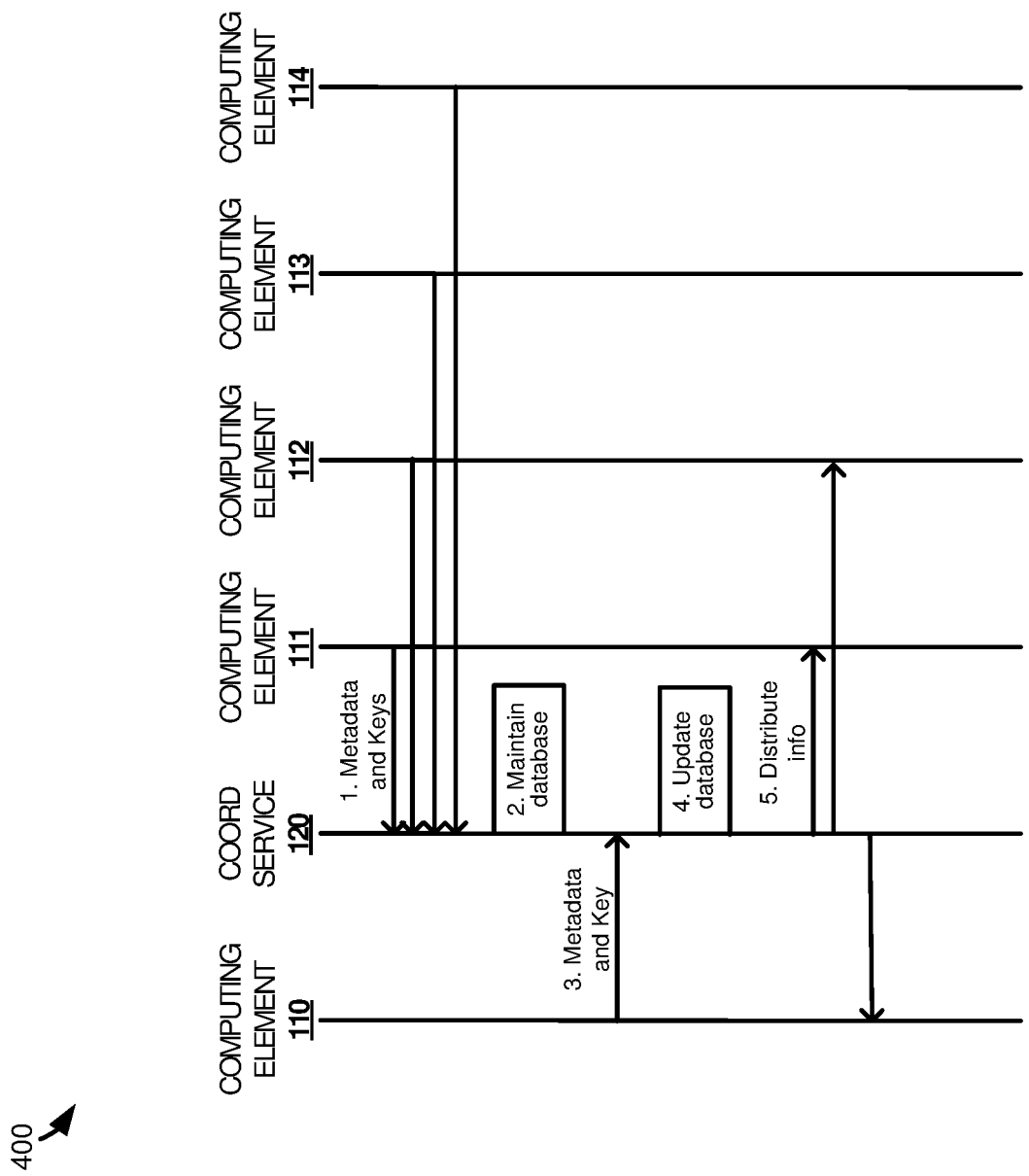
FIG. 4 illustrates a timing diagram of managing private networks according to an implementation.

FIG. 4 illustrates a timing diagram 400 of managing private networks according to an implementation. Timing diagram 400 includes computing elements 110-114 and coordination service 120 from computing environment 100 of FIG. 1.

In operation, coordination service 120 obtains, at step 1, computing element metadata and keys from computing elements 111-113. The keys correspond to public keys that permit computing elements in a shared private network to decrypt payloads, while the metadata may include addressing information for the computing element, authentication information associated with the user and the computing element, or some other information associated with the computing element. As the metadata and keys are obtained, coordination service 120 may maintain, at step 2, a database that can associate user and computing element identifiers with addressing and key information. In some implementations, each login to a computing element may include generating a unique device identifier and obtaining a token from the authentication service. The combination of the two may be used to identify the device and the corresponding user for communications.

As the database is maintained with the user and computing element information, computing element 110 may provide, at step 3, metadata and a public key to coordination service 120 in response to a login from a user at computing element 110. The metadata may include at least a token used to verify the user and a unique identifier to identify the computing element. The metadata may further include addressing information for the computing element, software or hardware information for the computing element, or some other information associated with the computing element.

After providing the metadata and the public key for computing element 110, coordination service 120 may update the database, at step 4, when computing element 110 is authorized based on the token from the authentication process. Coordination service 120 then identifies communication information associated with other computing elements in the private network for computing element 110 and distributes, at step 5, the communication information to the devices in the network. Here, computing elements 111-112 belong to the same private network as computing element 110. As a result, computing elements 111-112 are provided with communication information to communicate with computing element 110, while computing element 110 is provided with communication information to communicate with computing elements 111-112. The communication information may include the public key for each of the other computing elements, addressing information for each of the other computing elements, or some other information about the computing elements. In some implementations, the private networks may be configured by an administrator, wherein the administrator may indicate one or more users (identified via corresponding tokens) that are available to join each of the networks, types of computing elements that are available to join each of the networks, or some other definition for generating the various networks, including combinations thereof. Accordingly, when a registration for a computing element is received, the coordination service may identify attributes in the registration (user identifier via token, computing element hardware/software information, and the like) and determine one or more networks associated with the device.

Once the information is obtained from the coordination service, computing element 110 may communicate with computing elements 111-112 and, in return, computing elements 111-112 may communicate with computing element 110. For example, an application on computing element 110 may initiate a request to transfer a file to computing element 111. In some examples, the computing elements that share a private network may use private IP addresses that are allocated by coordination service 120 (e.g., an address for a virtual local area network (VLAN)). When a request is generated using a destination private address allocated by coordination service 120, the local private networking application on the computing element may encrypt the packet using the private key for the computing element and determine a path for the communication. The path may comprise a local or private network path when the computing elements are on the same local network, may comprise a direct path over the interne to a public IP address for the destination computing element, or may comprise a path over a relaying server that can act as an intermediary for the communications. Once a path is selected, a private tunnel packet is communicated to the destination computing element, wherein the private tunnel packet comprises a load of the encrypted packet and a header with destination addressing associated with the path. Advantageously, the sending computing element may perform network address translation (NAT) that can translate the private IP address allocated by coordination service 120 into the required destination addressing (destination IP, port, and the like) associated with the destination computing element.

As communications are received by a computing element, the computing element may determine the source of the communications and apply a public key associated with the source of the communication. The source can be identified using the source IP address, source MAC address, or some other addressing attributes that compared to the communication information supplied from coordination service 120. In the example of using the relay server, the relay server may obtain a packet communicated by a computing element in a private network and determine the destination computing element based on information in the header for the packet (e.g., the private IP address allocated by the coordination service). Once determined, the relay server may update the packet to the required addressing for the destination computing element and forward the packet to the destination computing element. Accordingly, the relay server may not decrypt the packet, but may use the addressing in the encapsulation header to determine the destination. Additionally, when distributing the addressing information for the computing elements of a private network, the coordination service may also distribute information about the relay server, permitting the computing elements to use the relay server in communicating packets.

In some implementations, the addressing information and public key information may be updated for each of the computing elements. These updates may occur when a computing element joins a new network, periodically, or at some other interval. When a modification is made, an update may be communicated to coordination service 120 that distributes the update to other computing elements in the same private network. The new information may be used by the other computing elements to maintain communications with the updated computing element. In some examples, when a computing element joins a new network, the computing element may contact the coordination service, indicating a port and destination IP address for the computing element. The coordination service may then distribute the port and destination IP address to other computing elements, permitting the other computing elements in the private network to initiate communications with computing element.

In some implementations, a computing element may update the private/public key pair for the device periodically, at the request of the coordination service, or at some other interval. For example, every hour a computing element may generate a new private/public key using a random or pseudorandom number generator and provide the new public key to the coordination service to replace the old public key. In providing the new public key, the computing element may verify possession of the previous private key, wherein the communication of the new public key may be encrypted using the old private key, such that the coordination service can verify that the key came from the appropriate computing element.

Figure 5:
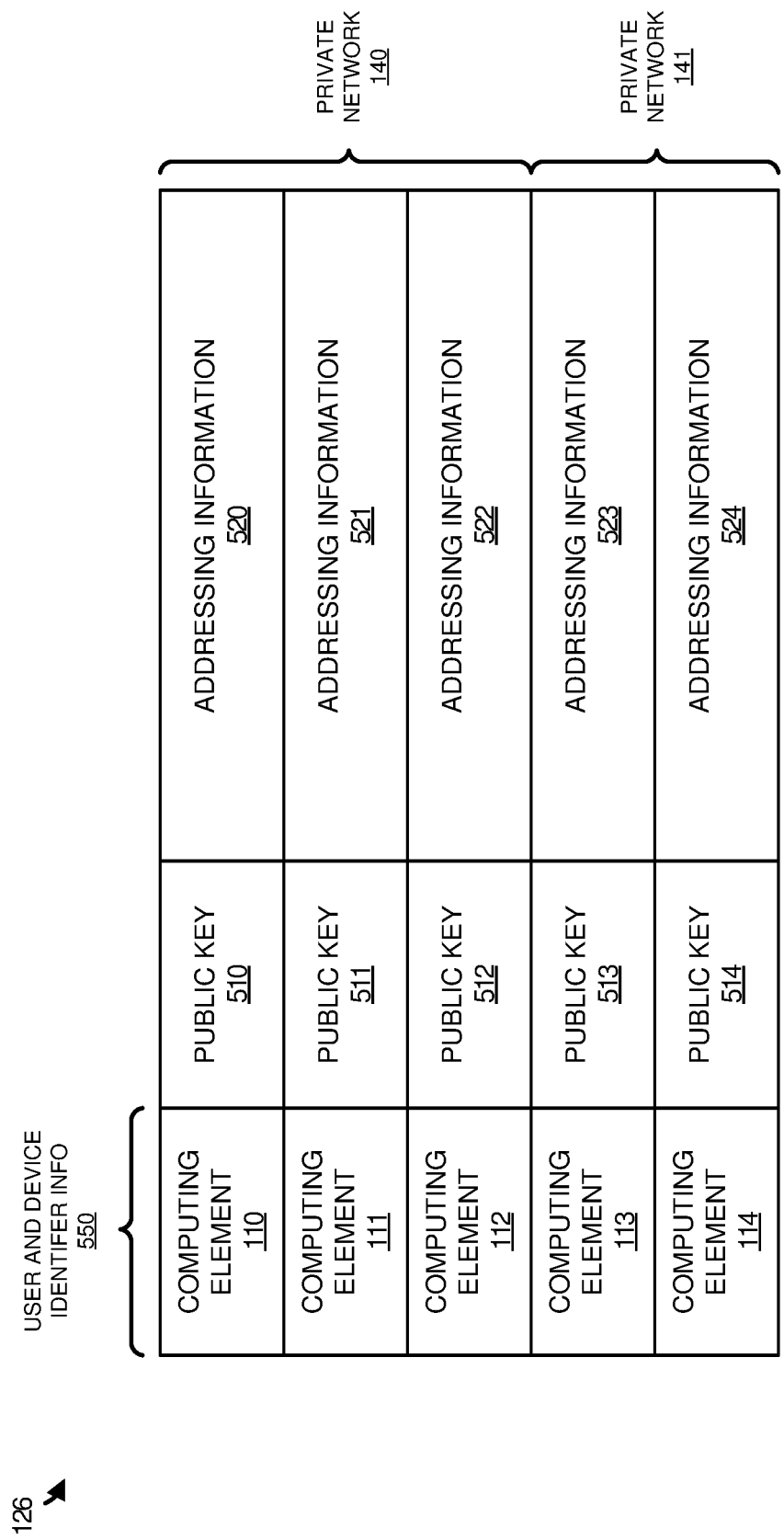
FIG. 5 illustrates a data store for computing system information according to an implementation.

FIG. 5 illustrates a data store 126 for computing system information according to an implementation. Data store 126 is an example data store for communication and authentication information associated with computing elements in one or more private networks. Although demonstrated as a table, it should be understood that the information may be maintained a tree, linked list, or some other data structure.

As described herein, as computing elements join a private network, information about the computing elements are communicated to a coordination service. Once received, the coordination service may maintain data store 126, which associates user and device identifier information 550 for computing elements 110-114 with public keys 510-514 and addressing information 520-524. In some implementations, the user and device identifier information 550, sometimes referred to as "device key" for each of the computing elements may correspond to a unique identifier allocated to the registering computing element and a token generated by an authentication service for the user of the computing element. The unique identifier may be allocated by the coordination service or may be determined locally using the private networking application, wherein the unique identifier may comprise any number of bits to uniquely identify the computing element. Associated with the user and device identifier information for each computing element, is a public key that is used to decrypt communications from the computing element and addressing information, which may include one or more IP addresses, ports, or other information associated with the computing element.

As data store 126 is maintained by the coordination service, the coordination service may distribute communication information to the computing elements in the private network. For example, when computing element 110 joins private network 140, data store 126 may be updated with the information associated with computing element 110 and the information about the computing element may be distributed to the other computing elements in the same private network 140. Additionally, data store 126 may be updated and used to distribute updated information to the computing elements when changes are made to the public keys, addressing, or some other modification.

Figure 6:
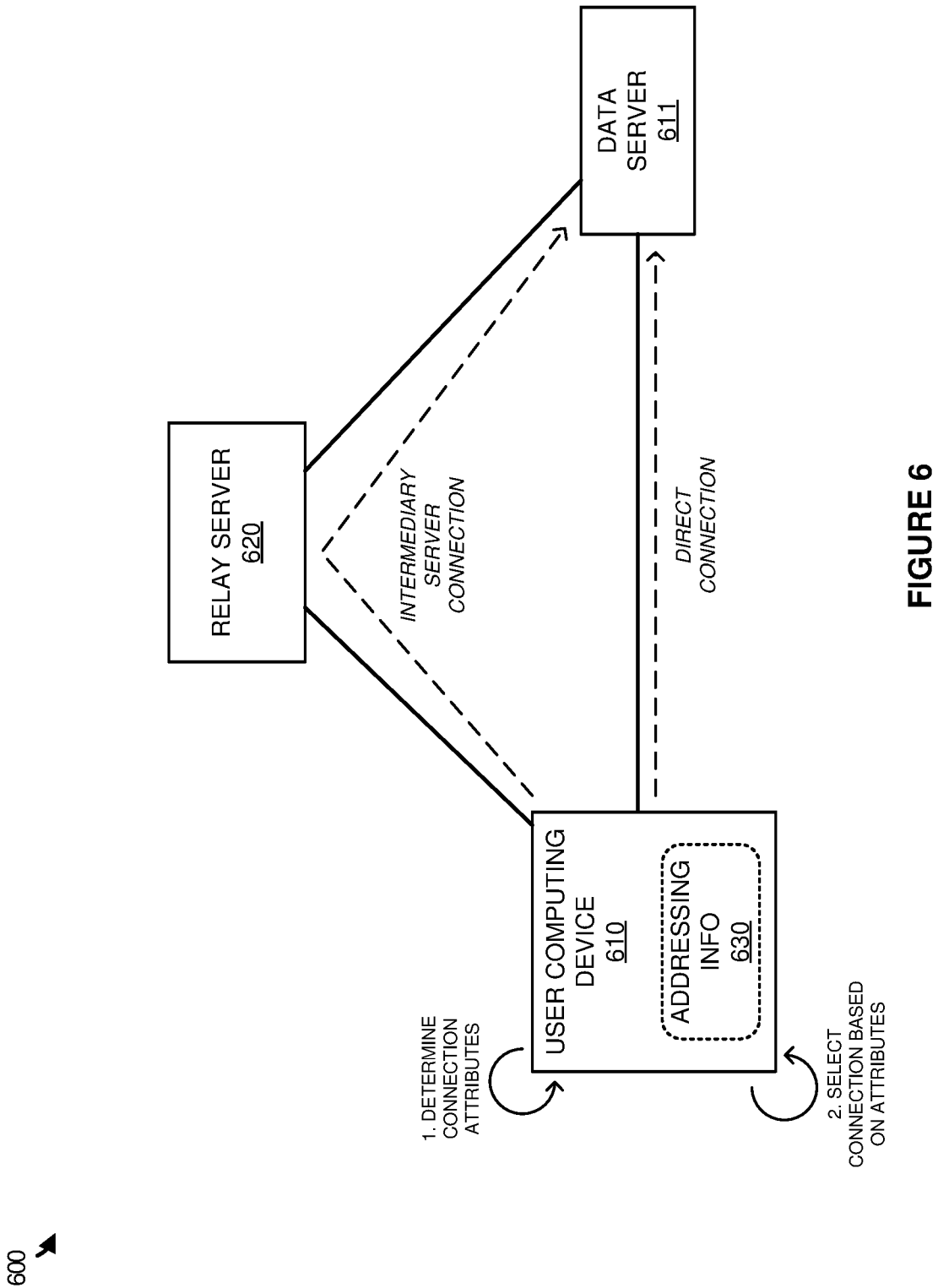
FIG. 6 illustrates an operational scenario of determining a connection path according to an implementation.

FIG. 6 illustrates an operational scenario 600 of determining a connection path according to an implementation. Operational scenario 600 includes user computing device 610, relay server 620, and data server 611. User computing device 610 further maintains addressing information 630 provided from a coordination service to manage a private network for user computing device 610.

In operation, user computing device 610 may determine, at step 1, connection attributes associated with the connection between user computing device 610 and data server 611. These connection attributes may correspond to the direct connection without the use of a private networking server or an intermediary server connection that traverses relay server 620. The connection attributes may correspond to latency, throughput, or some other information associated with the connection. In some implementations, user computing device 610 (and other computing elements in the private network) may open one or more ports in a firewall by sending packets to open a firewall to the computing device. The computing device may use these ports to test the connection paths between the computing elements of the private network.

In some examples, when a computing element joins a network, the computing element may initiate a connection with the coordination service, wherein the connection may be used to provide addressing information for the device (IP address(es), port(s), and the like). The addressing information may then be distributed to other computing elements indicating the available port(s) and address(es) for the computing element. Additionally, information may be provided to the computing elements indicating addressing for the relay server, such that the relay server can be used if firewalls prevent direct communications between the computing elements. The relay server may also be provided with addressing information for the computing elements in the private network such that the relay server may act as an intermediary for communications between the elements. In particular, when the relay server obtains a packet, the relay server may identify a destination computing element based on information in the header of the private network packet (e.g., private IP address allocated by the coordination service). The relay server may then forward the packet to the destination computing element.

Once connection attributes are determined for the different paths, user computing device 610 may select, at step 2, a connection based on the attributes. For example, if the direct connection between user computing device 610 and data server 611 provided the least amount of latency, user computing device 610 may select the connection. As a result, when a packet is generated that is directed at data server 611 (using the private IP address allocated by the coordination service), user computing device 610 may encrypt the packet using the private key for user computing device 610 and place the packet in the payload of a private networking packet. User computing device 610 may then add a header for the packet that includes addressing to directly communicate with data server 611, wherein the addressing may include a public destination address for data server 611, a port that has been opened by data server 611, or some other addressing information.

When a packet is received at data server 611, data server 611 may decrypt the packet from the payload using the public key associated with user computing device and forward the packet to a corresponding application or service on data server 611. In some implementations, data server 611 may check the source addressing associated with the packet prior to decrypting the packet and compare the source addressing to known computing elements in the private network. When the source addressing matches a known computing element for the private network, data server 611 may decrypt the packet using the public key associated with the source addressing.

Figure 7:
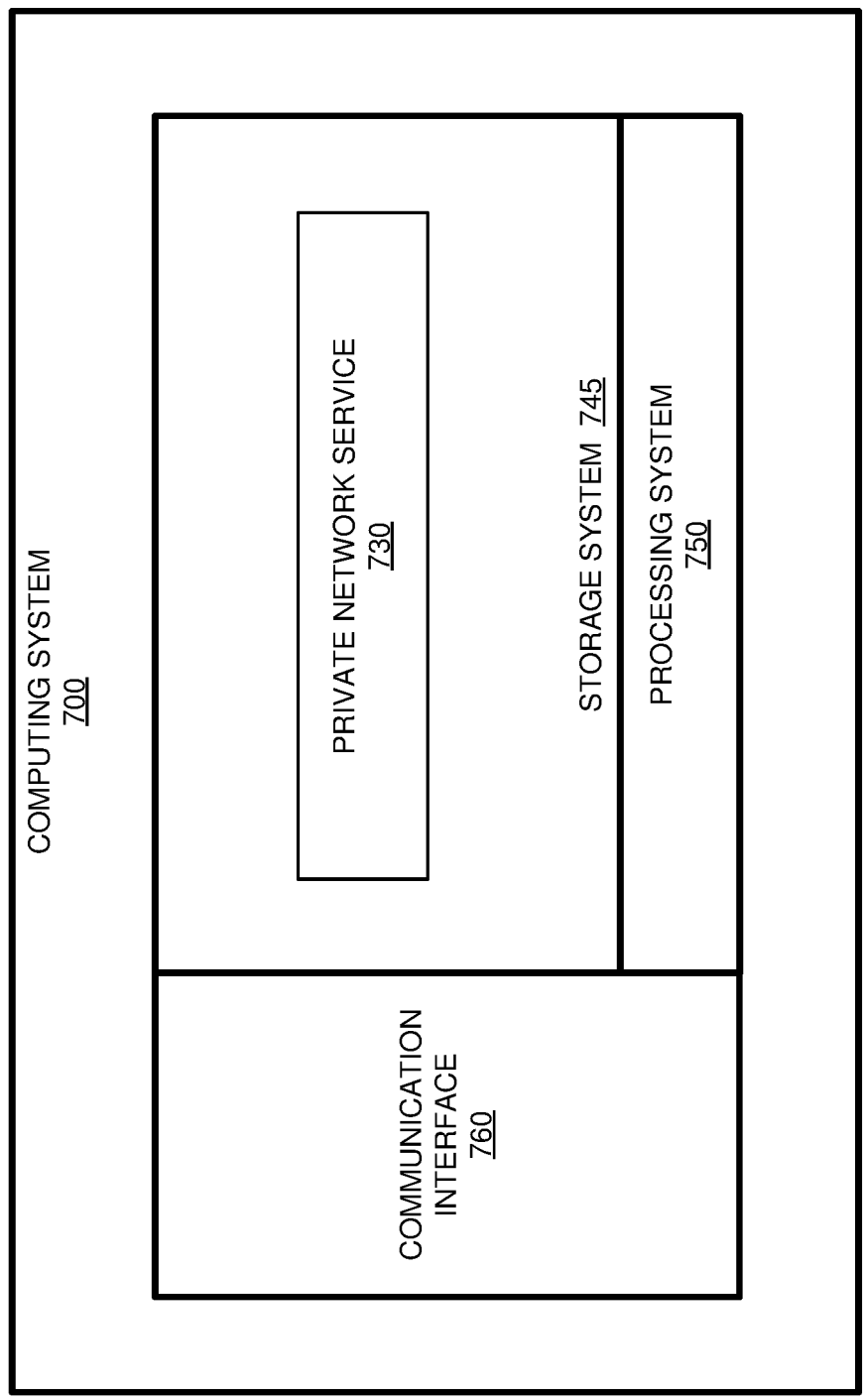
FIG. 7 illustrates a computing system to manage private network connections according to an implementation.

FIG. 7 illustrates a computing system 700 to manage private network connections according to an implementation. Computing system 700 is representative of any computing system or systems with which the various operational architectures, processes, scenarios, and sequences disclosed herein for a computing element can be implemented. Computing system 700 is an example computing element of computing elements 110-114, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with at least computing elements in the same private network, a coordination service, and an intermediary relay server, wherein the relay server can support connections between computing elements.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device, but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises private network service 730 capable of providing at least operation 200 of FIG. 2. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, private network service 730 directs processing system 750 to obtain credential information associated with a user of computing system 700. The credential information may comprise a username, password, or some other information. In some examples, the credential information may comprise a unique identifier for the device, wherein the unique identifier may be determined by private network service 730 using a hash or some other mechanism or may be allocated by the coordination service. Once the credential information is obtained, private network service 730 directs processing system 750 to generate a public and private key pair and communicate the public key with computing system metadata to a coordination service, wherein the metadata may include at least a portion of the credential information. In some examples, the metadata may include the token obtained for the user from the authentication service and may further include the unique identifier for computing system 700. A combination of the token and the unique identifier may be referred to as the device key. The coordination service may then store the public key and metadata in a data store and provide at least the public key and addressing information derived from the metadata to other computing elements in the user's private network. Additionally, private network service 730 may receive communication information associated with the one or more other computing elements in the private network for the user, wherein the communication information may be used to send and receive packets from the other computing elements. The communication information may include addressing information (IP addresses, ports, and the like) for the other computing elements and may further include public keys to decrypt packets received from the other computing elements.

Once the communication information is provided to computing system 700, the computing system may transfer and receive packets to other computing elements in the same private network. In one implementation, when a packet is identified as directed at a computing element in the private network, private network service 730 may encrypt the packet using the private key of the key pair and place the encrypted packet in the payload of the private networking packet. Once encrypted, addressing information associated with the destination computing element may be added to the packet and the private networking packet may be communicated to the destination computing element. In some examples, the computing elements in the same private network may each be allocated a unique virtual private IP network address by the coordination service. When a packet is directed at a computing element with an IP address allocated by the coordination service, private network service 730 may encrypt the packet using the private key and add addressing information associated with the destination computing element. The addressing information may comprise public or private IP addresses identified for the computing element and not allocated by the coordination service. In some examples, the communication may be direct with the destination computing element, however, it should be understood that a relay server may be used based on availability and network conditions associated with each of the computing elements.

Figure 8:
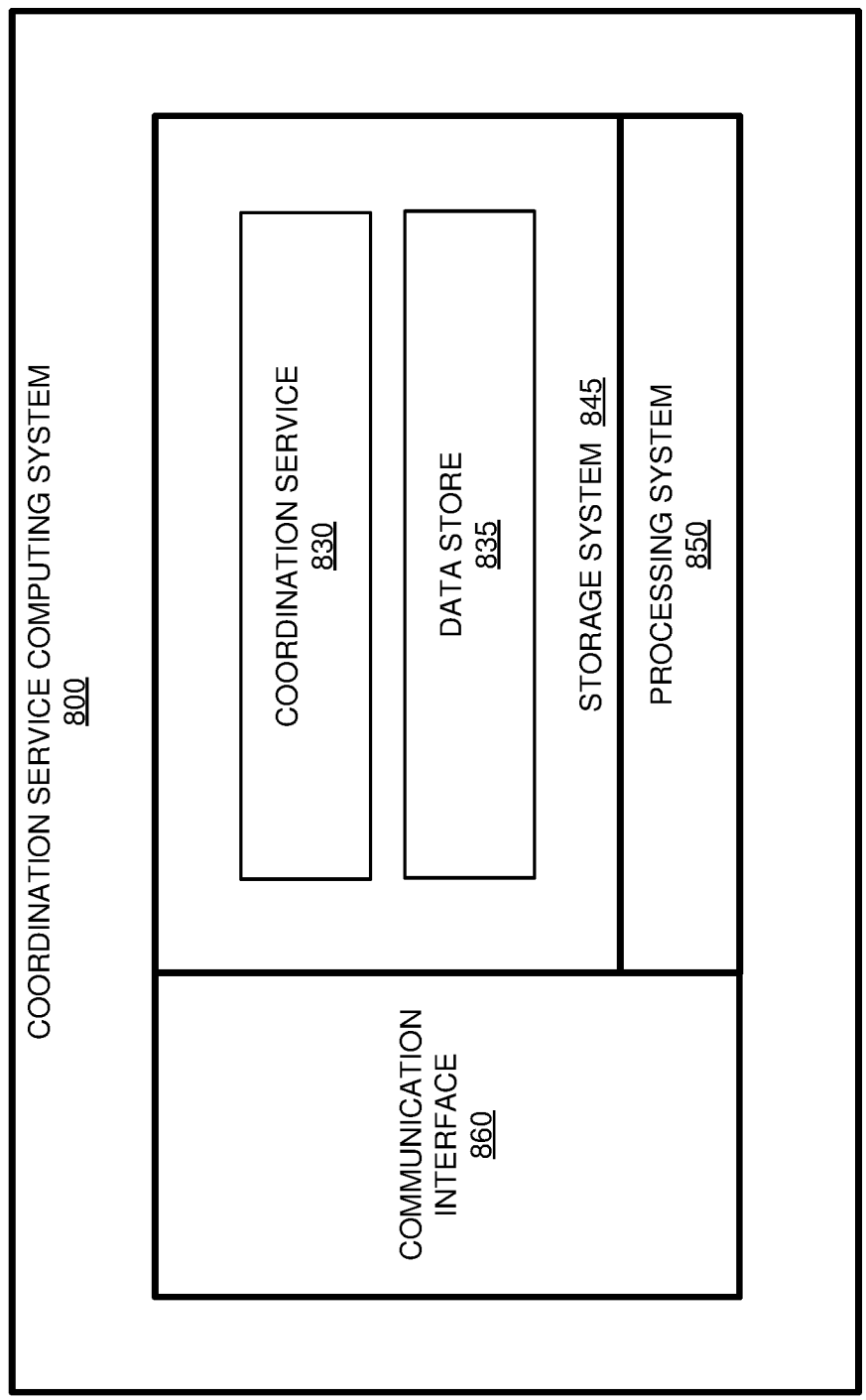
FIG. 8 illustrates a coordination service computing system to distribute and maintain private network information according to an implementation.

FIG. 8 illustrates a coordination service computing system 800 to distribute and maintain private network information according to an implementation. Computing system 800 is representative of any computing system or systems with which the various operational architectures, processes, scenarios, and sequences disclosed herein for a coordination service can be implemented. Computing system 800 is an example of coordination service 120 of FIG. 1, although other examples may exist. Computing system 800 includes storage system 845, processing system 850, and communication interface 860. Processing system 850 is operatively linked to communication interface 860 and storage system 845. Communication interface 860 may be communicatively linked to storage system 845 in some implementations. Computing system 800 may further include other components such as a battery and enclosure that are not shown for clarity.

Communication interface 860 comprises components that communicate over communication links, such as network cards, ports, radio frequency (RF), processing circuitry and software, or some other communication devices. Communication interface 860 may be configured to communicate over metallic, wireless, or optical links. Communication interface 860 may be configured to use Time Division Multiplex (TDM), Internet Protocol (IP), Ethernet, optical networking, wireless protocols, communication signaling, or some other communication format—including combinations thereof. Communication interface 860 is configured to communicate with physical and/or virtual computing elements in one or more private networks.

Processing system 850 comprises microprocessor and other circuitry that retrieves and executes operating software from storage system 845. Storage system 845 may include volatile and nonvolatile, removable and non-removable media implemented in any method or technology for storage of information, such as computer readable instructions, data structures, program modules, or other data. Storage system 845 may be implemented as a single storage device but may also be implemented across multiple storage devices or sub-systems. Storage system 845 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 850 is typically mounted on a circuit board that may also hold the storage system. The operating software of storage system 845 comprises computer programs, firmware, or some other form of machine-readable program instructions. The operating software of storage system 845 comprises coordination service 830 capable of providing at least operation 300 of FIG. 3. The operating software on storage system 845 may further include an operating system, utilities, drivers, network interfaces, applications, or some other type of software. When read and executed by processing system 850, the operating software on storage system 845 directs computing system 800 to operate as described herein.

In at least one implementation, coordination service 830 directs processing system 850 to receive registration information associated with computing elements for one or more private networks. The registration information from each of the computing elements may comprise a public key from a public key and private key pair used to encrypt and decrypt payloads of packets. The registration information may further include metadata, such as a token used to authenticate the user, a unique identifier to identify the device, or some other credential information. Further, the metadata may also include addressing information associated with the computing element. As the public keys and metadata are obtained for the computing elements, the information may be stored in data store 835.

As the data is stored, coordination service 830 may direct processing system 850 to distribute the keys and the addressing information to computing elements of the one or more private networks to permit the computing elements to communicate with other elements in the same private network. In some implementations, coordination service 830 may, for each private network, allocate unique virtual IP addresses to each computing element of the network, such that the computing elements may communicate and be presented with other computing elements as if they are located on the same local private network. When a communication is required, an application may generate a packet using a destination IP address allocated from the coordination service. The private network service on the sending computing element may identify the use of the IP address and may trigger encapsulation operations to encrypt the packet in the payload of a second packet and add addressing information associated with the destination computing element. For example, a destination computing element may be allocated a public IP address of 1.1.1.1 and the coordination service may allocate a virtual IP address of 192.1.1.2. When a packet is communicated with a destination of 192.1.1.2, the packet may be encrypted into the load of a private network packet and a header may be added to the private network packet that includes 1.1.1.1 as the destination IP address.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing element comprising:

receiving, from a coordination service, communication information associated with one or more other computing elements for a private network, wherein the communication information comprises at least a public key associated with each computing element of the one or more other computing elements and internet protocol (IP) addressing associated with each computing element of the one or more other computing elements, and wherein the IP addressing associated with each computing element of the one or more computing elements comprises at least a private IP address assigned by the coordination service and a public IP address;

identifying a packet directed the private IP address assigned to a second computing element of the one or more other computing elements by the coordination service;

encrypting the packet with the private IP address using the public key associated with the second computing element;

placing the encrypted packet in a payload of a second packet;

adding at least the public IP address associated with the second computing element to a header portion of the second packet; and communicating the second packet to the second computing device.

2. The method of claim 1, wherein the computing element comprises a physical computing device or a virtual machine.

3. The method of claim 1 further comprising:

generating a public key and a private key for the computing element in the private network; and communicating the public key associated with the computing element to the coordination service.

4. The method of claim 3 further comprising:

obtaining credential information associated with a user of the computing element; and generating the public key and private key in response to obtaining the credential information.

5. The method of claim 3 further comprising:

communicating one or more public IP addresses associated with the computing element to the coordination service.

6. The method of claim 3 further comprising:

generating a second public key and a second private key for the computing element in the private network; and communicating the second public key to the coordination service to replace the public key for the computing element, wherein the communication demonstrates possession of the private key by the computing element.

7. A computing apparatus comprising:

a storage system;

a processing system operatively coupled to the storage system; and program instructions stored on the storage system to operate as a computing element in a private network that, when executed by the processing system, direct the computing apparatus to:

receive, from a coordination service, communication information associated with one or more other computing elements for the private network, wherein the communication information comprises at least a public key associated with each computing element of the one or more other computing elements and internet protocol (IP) addressing associated with each computing element of the one or more other computing elements, and wherein the IP addressing associated with each computing element of the one or more computing elements comprises at least a private IP address assigned by the coordination service and a public IP address;

identify a packet directed the private IP address assigned to a second computing element of the one or more other computing elements by the coordination service;

encrypt the packet with the private IP address using the public key associated with the second computing element;

place the encrypted packet in a payload of a second packet;

add at least the public IP address associated with the second computing element to a header portion of the second packet; and communicate the second packet to the second computing device.

8. The computing apparatus of claim 7, wherein the one or more other computing elements comprise physical computing devices or virtual machines.

9. The computing apparatus of claim 7, wherein the program instructions further direct the computing apparatus to:

generate a public key and a private key for the computing element in the private network; and communicate the public key associated with the computing element to the coordination service.

10. The computing apparatus of claim 9, wherein the program instructions further direct the computing apparatus to:

obtain credential information associated with a user of the computing element; and generate the public key and private key in response to obtaining the credential information.

11. The computing apparatus of claim 9, wherein the program instructions further direct the computing apparatus to:

communicate one or more public IP addresses associated with the computing element to the coordination service.

12. The computing apparatus of claim 9, wherein the program instructions further direct the computing apparatus to:

generate a second public key and a second private key for the computing element in the private network; and communicate the second public key to the coordination service to replace the public key for the computing element, wherein the communication demonstrates possession of the private key by the computing element.

\* \* \* \* \*